(12) United States Patent
Townsley et al.

(10) Patent No.: US 7,624,181 B2
(45) Date of Patent: Nov. 24, 2009

(54) TECHNIQUES FOR AUTHENTICATING A SUBSCRIBER FOR AN ACCESS NETWORK USING DHCP

(75) Inventors: William Mark Townsley, Nashville, TN (US); Ralph Droms, Westford, MA (US); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 389 days.

(21) Appl. No.: 11/362,296

(22) Filed: Feb. 24, 2006

(65) Prior Publication Data

US 2007/0204330 A1     Aug. 30, 2007

(51) Int. Cl.
  *G06F 15/173*   (2006.01)
  *G06F 15/16*    (2006.01)
(52) U.S. Cl. ............................ 709/225; 709/229; 726/4
(58) Field of Classification Search ......... 709/217–219, 709/223–230; 726/4
See application file for complete search history.

(56) References Cited

U.S. PATENT DOCUMENTS

| | | | | |
|---|---|---|---|---|
| 6,092,110 | A * | 7/2000 | Maria et al. ................ | 709/225 |
| 6,286,039 | B1 | 9/2001 | Van Horne et al. | |
| 7,082,535 | B1 * | 7/2006 | Norman et al. ............. | 713/163 |
| 7,342,906 | B1 | 3/2008 | Calhoun | |
| 7,461,251 | B2 * | 12/2008 | Oishi ......................... | 713/162 |
| 7,568,040 | B2 | 7/2009 | Townsley et al. | |
| 2002/0006133 | A1 | 1/2002 | Kakemizu et al. | |
| 2002/0013844 | A1 | 1/2002 | Garrett et al. | |
| 2002/0098840 | A1 | 7/2002 | Hanson et al. | |
| 2003/0101243 | A1 | 5/2003 | Donahue et al. | |
| 2003/0143973 | A1 * | 7/2003 | Nagy et al. ................. | 455/403 |
| 2004/0252693 | A1 * | 12/2004 | Cheriton et al. .......... | 370/395.1 |
| 2005/0105529 | A1 | 5/2005 | Arberg et al. | |
| 2005/0286518 | A1 | 12/2005 | Park et al. | |
| 2006/0174324 | A1 * | 8/2006 | Zur et al. ................... | 726/3 |

(Continued)

FOREIGN PATENT DOCUMENTS

KR    1020020077049    12/2002

(Continued)

OTHER PUBLICATIONS

RFC 2865—Remote Authentication Dial In User Service (RADIUS), Rigney et al., Jun. 2000.*

(Continued)

*Primary Examiner*—Yasin M Barqadle
(74) *Attorney, Agent, or Firm*—Patent Capital Group

(57) ABSTRACT

Techniques for authenticating a user for access to an IP network include receiving from the user's host a DHCP request which includes user identifier data. A random challenge value is determined and sent to the user's host in a DHCP message format. A response message that includes a response value is received from the user's host in DHCP format. A verification value is determined based on a password value associated with the user identifier value in an AAA server and the current challenge value using a secure process that renders impractical an attempt to derive the password. If it is determined that the response value does not match the verification value, then a DHCP offer is prevented from being sent to the user's host in response to the DHCP request. Thus, a user is authenticated using DHCP instead of PPP.

42 Claims, 8 Drawing Sheets

U.S. PATENT DOCUMENTS

2007/0180499 A1* 8/2007 Van Bemmel .................. 726/4
2007/0203999 A1 8/2007 Townsley et al.

FOREIGN PATENT DOCUMENTS

WO    WO2005104500    11/2005

OTHER PUBLICATIONS

RFC 3748—Extensible Authentication Protocol (EAP), Aboda et al., Jun. 2004.*
Simpson, W., PPP Challenge Handshake Authetnication Protocol (CHAP), www.ietf.org/rfc/rfc1994.txt, Aug. 1, 1996, p. 12, Publisher: Internet Engineering Task Force, , Published in: Internet.
Patrick, M., DHCP Relay Agent Information Option, www.ietf.org/rfc/rfc3046.txt, Jan. 1, 2001, p. 14, Publisher: Internet Engineering Task Force, Published in: Internet.
Droms, R., Authentication for DHCP Messages, www.ietf.org/rfc/rfc3118.txt, Jun. 1, 2001, p. 17, Publisher: Internet Engineering Task Force, Published in: Internet.
Droms, "RFC 2132—DHCP Options and BOOTP Vendor Extensions," Mar. 1997, Internet: ietf.org, 32 pages.
Droms, "RFC 2131—Dynamic Host Configuration Protocol," Mar. 1997, Internet: ietf.org, 43 pages.
Kivinen, "Using RADIUS backend for DHCP over IKE," Apr. 2003, Internet: ietf.org, 4 pages.
Droms et al., "RFC 4014—Remote Authentication Dial-In User Service (RADIUS) Attributes Suboption for the Dynamic Host Configuration Protocol (DHCP) Relay Agent Information Option," Feb. 2005, Internet: ietf.org, 8 pages.
Congdon et al., "RFC 3580—IEEE 802.1x Remote Authentication Dial in User Service (RADIUS) Usage Guidelines," Sep. 2003, Internet: ietf.org, 29 pages.

* cited by examiner

TECHNIQUES FOR AUTHENTICATING A SUBSCRIBER FOR AN ACCESS NETWORK USING DHCP

BACKGROUND OF THE INVENTION

1. Field of the Invention

The present invention relates to migrating point to point protocol (PPP) functions for customer access of a wide area network to the Internet Protocol (IP).

2. Description of the Related Art

Networks of general purpose computer systems and special devices connected by external communication links are well known. The networks often include one or more network devices that facilitate the passage of information between the computer systems. A network node is a network device or computer system or special device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The next protocol is said to be encapsulated in the particular protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

One such layer 2 protocol is the Point to Point Protocol (PPP) between a host computer on a local area network and a network node that provides access to a wide area network, such as the Internet. Some protocols, including PPP, pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications. For example, authentication information used to authenticate users and layer 3 address assignment information used by routers to direct data packets according to their layer 3 addresses are passed between nodes in PPP control messages in the PPP control plane.

PPP provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994, the entire contents of which are hereby incorporated by reference as if fully set forth herein. Copies of RFC 1661 and other RFCs cited below are available at the World Wide Web domain ietf.org. PPP has been used extensively to connect users at a home site to a remote network using modems and telephone copper loop infrastructure. PPP provides a robust control plane for signaling line characteristics, network protocol parameters, and user-level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology, when access providers wish to distinguish different users connected via the same modem to the remote network. PPP provides this distinction by opening different sessions with different users. PPPoE is described in IETF RFC 2516, the entire contents of which are hereby incorporated by reference as if fully set forth herein. After establishing a PPP session, IP data packets are sent encapsulated in PPPoE.

There is a trend among network service providers to move to Ethernet and IP as the only layer two and layer three protocols between end nodes at a user site and end nodes on the remote network to which access is sought. One reason given for this trend is a desire to make use of IP-based quality of service (QoS) capabilities available in access network equipment. Another reason given is to reduce complexity because data packets can be transmitted from one portion of the network infrastructure to another without translating between layer 2 protocols. Another reason given is that using IP over Ethernet will improve the bandwidth utilization per transmitted frame due to a lower protocol overhead.

One approach is to eliminate PPP and PPPoE; and provide the PPP functions using IP-based functions. For example, it has been proposed to use International Electrical and Electronics Engineers standard 802.1x or web portal methods for authentication, and to use the Dynamic Host Configuration Protocol (DHCP) for assigning IP addresses. A justification offered for this approach is that, when all encapsulated data packets are IP, the multi-protocol encapsulation capability of PPP is not valuable.

There are some disadvantages to eliminating PPP. For example, web portal based authentication has drawbacks in that it requires a specific application (web browser) to be activated before anything can happen. The existing IP-based functions do not perform all the functions performed by PPP. Some of these protocols would have to be extended to perform the missing functions. For example, DHCP would have to be extended to perform user authentication and integration with an authorization server, configure link-level parameters such as maximum reception unit (MRU), and include a connection "keep-alive" mechanism, among other tasks, in order to encompass all of the functionality that PPP offers today.

In one approach, described in RFC 3118 on DHCP authentication, a mechanism is presented that is directed to authenticating the DHCP messages themselves to ensure that they did not get altered in transit, rather than authenticating the user.

PPP provides a "keep-alive" mechanism for detecting when a session is active and available so that reallocation of an IP address or billing can take place on session termination. DHCP does not have any mechanism today apart from a lease timeout. In one approach, DHCP is used with very short lease times, e.g., as short as 5 seconds. A problem with this approach is that devices for users who engage in sessions that last longer than the lease time have to negotiate new leases with the DHCP server, increasing the consumption of network resources both in terms of traffic volume and computational time at a node that hosts a DHCP server.

Also, as pointed out above, especially in large service provider networks, PPP-based functions are generally well entrenched with provider-specific extensions. For example, some provider-specific extensions provide authorization to determine whether an authentic user is in good standing for receiving one or more services, e.g., for paid-up basic services, for voice services, or for a particular quality of service, or some combination. Many of these extensions involve a Broadband Remote Access Server (BRAS) hooking into an Authentication, Authorization, Accounting (AAA) server like the Remote Authentication Dial-In User Service (RADIUS) server. Neither RFC 3118 nor DHCP addresses determining whether an authentic user is actually authorized to access any particular services on the network or involve hooking into an AAA server. A wholesale replacement of general PPP functions with IP will not address any provider-specific extensions. Some transition period is needed to give the provider time to adapt the provider-specific extensions to the IP mechanisms.

Based on the foregoing, there is a clear need for techniques that migrate one or more PPP functions to IP over Ethernet infrastructure but that do not suffer all the disadvantages of the prior art approaches. In particular there is a need to provide user authentication and authorization function in IP; and to deny access to unauthenticated or unauthorized users.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
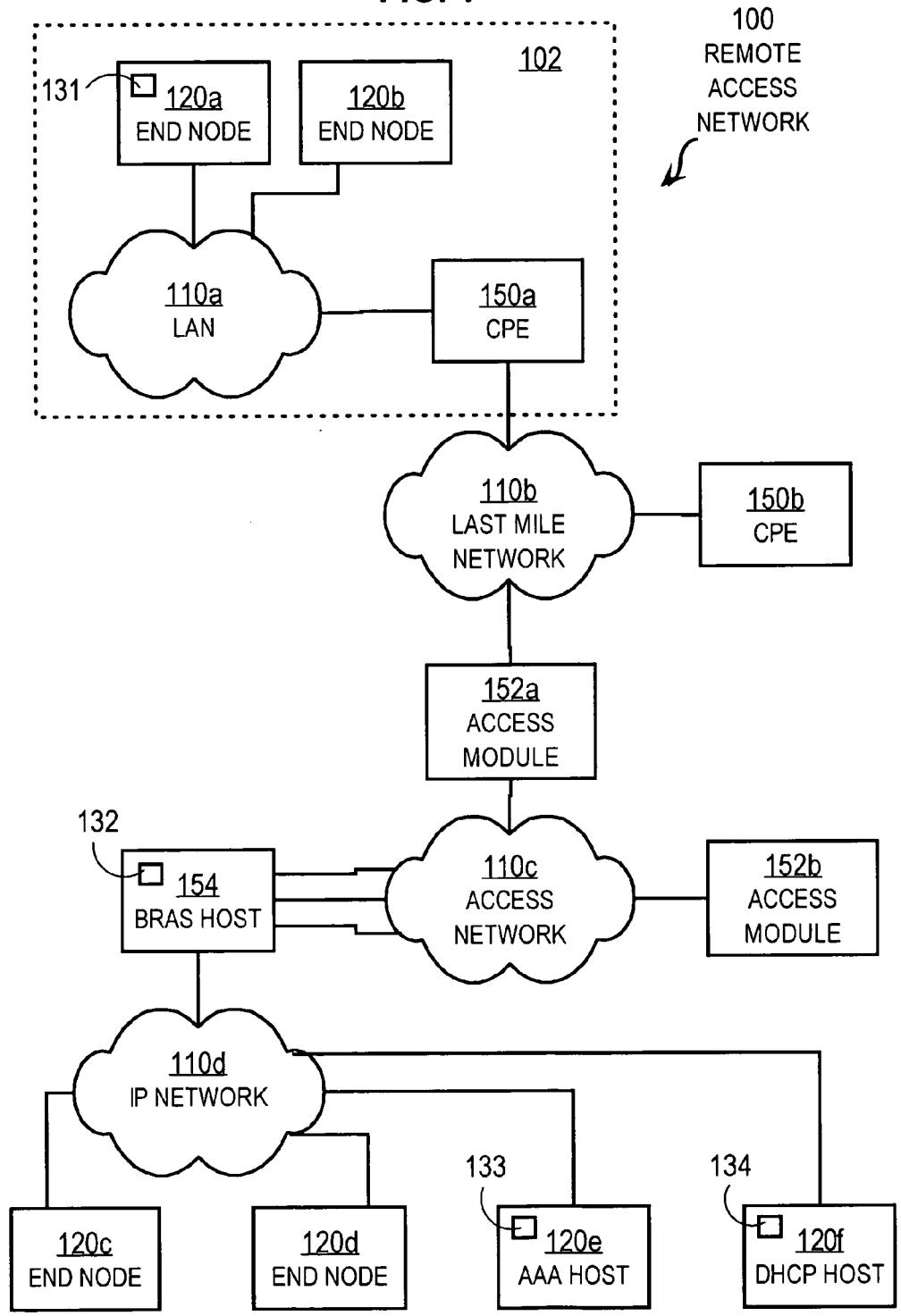
FIG. 1 is a block diagram that illustrates a remote access network, according to an embodiment.

A method and apparatus and system are described for migrating at least PPP authentication functionality to DHCP. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In various embodiments described herein, techniques are provided that perform at least some PPP control plane functionality while utilizing DHCP, itself a purely control plane protocol. In the following description, embodiments are described primarily in the context of migrating the PPP authentication functionality to DHCP by defining new challenge and response DHCP processes and DHCP message types. However, the invention is not limited to these embodiments. In other embodiments, other formats carried by DHCP are used. For example, in some embodiments, the Extensible Authentication Protocol (EAP), already proposed for use within DHCP, is used to carry challenge and response authentication information. In various embodiments, PPP authentication is expanded in the DHCP implementation; for example by including text messages for presentation to a user in case of authentication success or failure or both. In some embodiments, DHCP messages are used in Network Admission Control (NAC) to authenticate any host connected to an enterprise network to ensure that the new host is authorized for connection and has the correct posture (e.g., operating system type and version, and virus updates, among others).

DHCP is based on a client-server model of network communications, well known and widely used in the art. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, redundancy, or other advantages, or some combination.

According to the DHCP client server model, a DHCP client operating on a device communicates with one or more DHCP servers to obtain configuration information, including an IP address for the client's host device.

1.0 Network Overview

FIG. 1 is a block diagram that illustrates a remote access network 100, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers, video content sources and television set boxes. A local area network (LAN) 110a is an example of such a sub-network. The network's topology is defined by an arrangement of end nodes (e.g., end nodes 120a, 120b, 120c, 120d, 120e, 120f collectively referenced hereinafter as end nodes 120) that communicate with one another, typically through one or more intermediate network nodes, such as a router or switch, that facilitate routing data between end nodes 120 on different sub-networks. As used herein, an end node 120 is a node that is configured to originate or terminate communications over the network. End nodes 120 include an Authentication, Authorization, Accounting (AAA) server host 120e, and a DHCP server host 120f.

In contrast, an intermediate network node facilitates the passage of data between end nodes. Intermediate network nodes depicted in FIG. 1 include customer premises equipment (CPE) 150a, 150b, access modules 152a, 152b, and Broadband Remote Access Server (BRAS) node 154.

Four sub-networks 110 that are typically involved in remote access are depicted in FIG. 1. Each sub-network 110 may include zero or more intermediate network nodes. An IP network 110d is the target network (also called a "core" network) for remote access by users at a remote site 102.

To access IP network 110d, a LAN 110a is connected to CPE 150a which serves as a bridge to a network 110b called the last mile network. The last mile network 110b is built on a telephone wire infrastructure, such as dial-up or digital subscriber line (DSL), or cable television infrastructure, either coaxial cable or optical fiber, or a wireless infrastructure, such as WiFi (IEEE standard 802.11). In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure. In some cases, CPE is a telephone modem using acoustic signals over a low-bandwidth legacy telephone system. In an illustrated embodiment, CPE 150a is a digital subscriber line (DSL) modem for establishing a high bandwidth DSL connection over the telephone wire as last mile network 110b. In some embodiments, CPE 150a is a combined router and end node, such as a cable television set-top box, and LAN 110a; end nodes 120a, 120b are omitted; and process 131 executes on CPE 150a.

Communications over sub-network 110b from CPE 150a, 150b terminate at access module 152a. Although two CPEs 150a, 150b are depicted connected to sub-network 110b, in other embodiments more or fewer CPEs are connected to sub-network 110b. In an illustrated embodiment, access module 152a is a DSL Access Module (DSLAM). In other embodiments, access module 152a is a controller for a bank of low-bandwidth modems or a cable or optical access module.

An internet service provider (ISP) typically maintains or leases at least portions of several access modules 152a, 152b and an access network 110c for connection to the IP network 110d (also called a "core" network) through a remote access server (RAS) such as a Broadband Remote Access Server (BRAS) host 154. In many current embodiments, the access network 110c is migrating to an Ethernet infrastructure that supports the Internet Protocol (IP).

According to various illustrated embodiments of the invention, a challenge-response client 131 executes at end node 120a, a challenge-response verification process executes at AAA host 120e, and a challenging process 132, 134 executes on BRAS host 154 or DHCP host 120f, respectively, or some other node on IP network 110d or access network 110c.

2.0 Structural Elements

Figure 2:
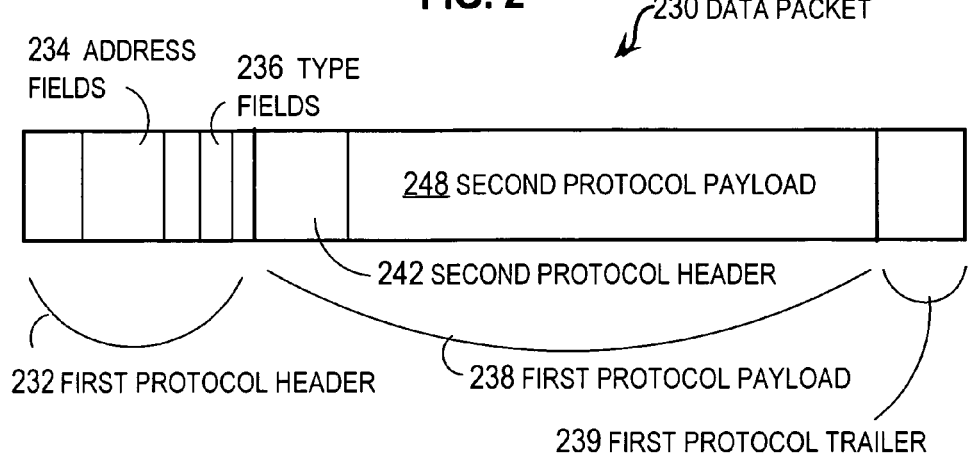
FIG. 2 is a block diagram that illustrates a packet of data communicated over a network.

FIG. 2 is a block diagram that illustrates a generalized data packet 230 communicated over a network, such as network 100. Each packet typically comprises one or more payloads of data, e.g. payloads 238, 248, each encapsulated by at least one network header, e.g., headers 232, 242, respectively. For example, payloads are encapsulated by appending a header before the payload, sometimes called prepending a header, and sometimes by appending a trailer (or tail) after the payload. Each header 232, 242 is formatted in accordance with a network communication protocol; header 232 is formatted according to a first protocol and header 242 is formatted according to a second protocol. The header 242 for the second protocol is included within the payload 238 of the first protocol. As used herein, a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 232 for the first protocol includes type fields 236. The header for a protocol often includes a destination address or a source address, or both, for the information in the payload. For example, the header 232 for the first protocol includes address fields 234 where the source and receiver address for the first protocol is located within the packet 230. As described above, a transmitted data packet's network headers include at least a physical link (layer 1) header and a data-link (layer 2) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination.

The data-link header provides information for transmitting the packet over a particular physical link (i.e., a communication medium), such as a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header is a layer 3 header that provides information defining the source and destination address within the interconnected sub-networks (internetwork). Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

DHCP is a control plane protocol that uses messages carried by the User Datagram Protocol (UDP) to transmit IP addresses and other configuration information used to set up IP as the layer 3 protocol, i.e., the internetwork protocol. UDP is a simple, small and fast layer 4 protocol without sophisticated error-tracking and sequencing mechanisms, which utilizes IP broadcasts as a layer 3 protocol to carry UDP messages with DHCP payloads. IP broadcasts do not rely on individual IP addresses for recipients, but direct data packets to all hosts on a particular network segment. An IP broadcast is indicated by a special broadcast value in the IP destination address field of an IP header. A host without an IP address, such as the DHCP client's host, can send an IP data packet by inserting a null address (e.g., 0.0.0.0) in the IP source address field of an IP header, and can receive IP broadcast data packets. DHCP agents are processes on intermediate network nodes that forward DHCP broadcasts received on one segment to a different network segment, as desired.

Figure 3:
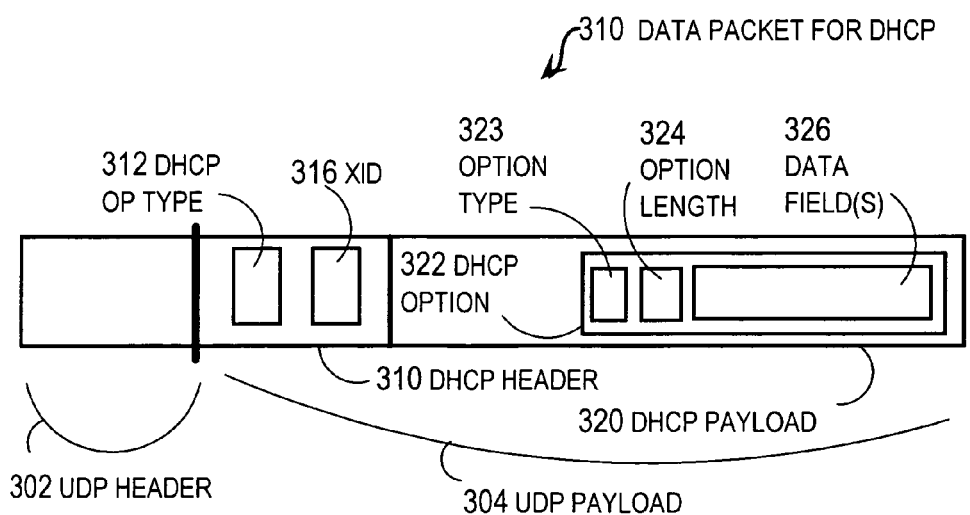
FIG. 3 is a block diagram that illustrates a DHCP packet of data communicated over a network.

FIG. 3 is a block diagram that illustrates a data packet 310 for a DHCP message communicated over a network. A DHCP message is carried inside a UDP payload 304 that follows the UDP header 302. The DHCP message includes a DHCP header 310 and a DHCP payload 320. According to the DHCP standard, described in RFC 2131 and RFC 2132 the entire contents of each of which are herby incorporated by reference as if fully set forth herein, the DHCP header 310 includes an op type field 312 and an xid field 316. The DHCP header 310 also includes other fields that are not relevant to understanding embodiments of the invention. Data held in the DHCP op type field 312 indicates whether the message is sent by a DHCP client to a DHCP server, or is sent by a DHCP server to a DHCP client, as is well known in the art. Data held in the DHCP xid field 312 is usually used by a DHCP client to match incoming DHCP messages with pending DHCP requests for configuration data.

The DHCP payload 320 includes one or more required or optional fields, or both, depending on the message type indicated in message type option field 322. A DHCP option field 322 is illustrated. The DHCP option field 322 includes an option type field 323 and option length field 324 and one or more option data fields 326, depending on the option type expressed in the option type field 323. Data held in the option type field 323 indicates the type of option. Data held in the DHCP option length field 324 indicates the length of the DHCP option. Data held in the DHCP option data fields 326 indicates the values of one or more attributes associated with the option type indicated in the option type field 323. One option carried in the DHCP payload contains an attribute that indicates the type of the DHCP message, such as a DHCP-DISCOVER message or a DHCPOFFER message. Different values in the attribute field correspond to different message types. All of the message type are defined in RFC 2131, RFC 2132 and subsequent RFCs, well known in the art. A DHCP payload may carry multiple data options fields like field 322.

Figure 4:
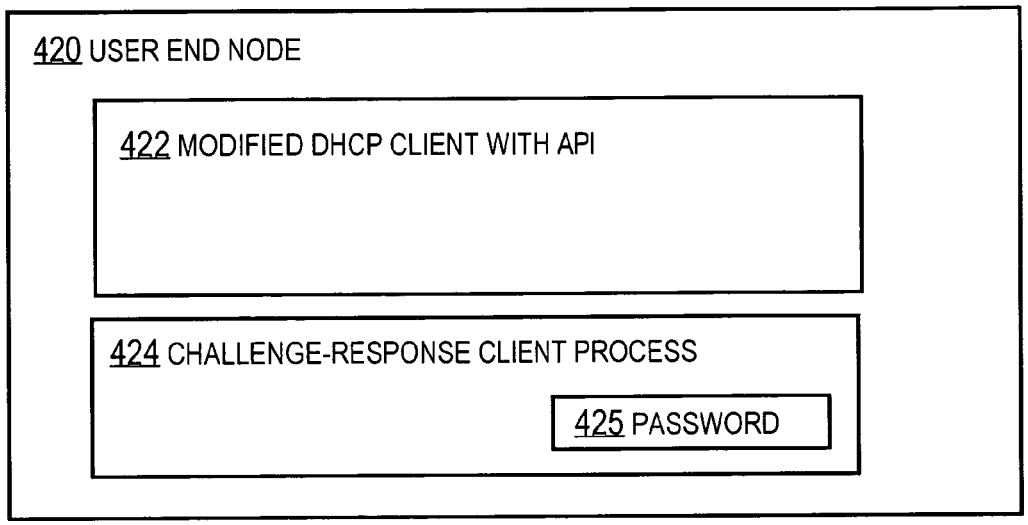
FIG. 4 is a block diagram that illustrates an end user host according to an embodiment.

FIG. 4 is a block diagram that illustrates a user end node host 420, according an embodiment. User end node host 420 includes a modified DHCP client 422 and a challenge-response client 424, such as client 131 on end node 120a. The challenge-response client 424 includes a password field 425 in a data structure that supports the client 424. In the illustrated embodiment, the modified DHCP client 422 has an Application Program Interface (API) through which external processes can exchange information with the modified DHCP client 422. In some embodiments, the challenge-response client 424 is incorporated within the modified DHCP client 422.

According to embodiments of the invention, the modified DHCP client 422 is modified from the standard DHCP client in order to engage the challenge-response client 424 to accomplish authentication using DHCP messages, as described in more detail below with reference to FIG. 8.

The password field 425 holds data that indicates a shared secret with an AAA server. The contents of field 425 may be filled in any manner known in the art. For example, a prompt is sent by the challenge-response client 424 to a user and the user enters a value for the password in response to the prompt. The user-entered value is stored in field 425. In some embodiments, the user end node host stores the user-entered value to automatically respond to further prompts. In some embodiments the challenge-response client 424 also prompts the user for a user identifier (user ID) shared with the AAA server and the user enters a value for the user ID in response. Typically, the user ID value is not secret. Any method may be used to establish the secret password shared by the user and the AAA server. In some embodiments, the user is made aware of the user ID and password as recorded by the AAA server through an out-of-band communication, e.g., by telephone or traditional postal delivery, from the ISP. In some embodiments, the user establishes a password online; e.g., if the user has access to the Internet via some other means, or if a "captive portal" is permitted for the user, or if the user is simply changing the password. Also, some EAP methods relying on "certificates" and public/private key infrastructure (PKIs) to establish initial encrypted communications, are used to secretly exchange the password, in some embodiments.

Figure 5:
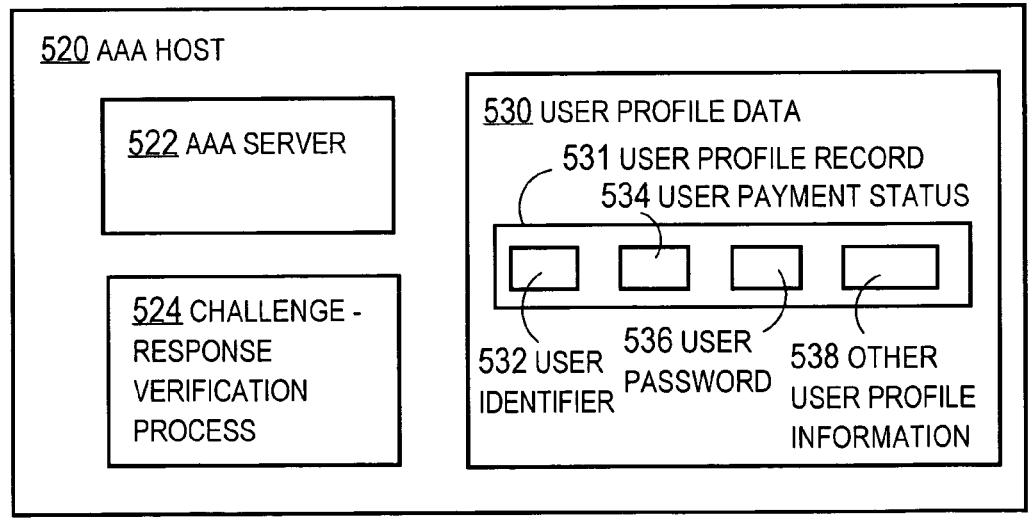
FIG. 5 is a block diagram that illustrates an AAA server host, according to an embodiment.

FIG. 5 is a block diagram that illustrates an AAA server host 520, according an embodiment. AAA server host 520 includes an AAA server 522, a user profile data structure 530 and a challenge-response verification process 524, such as verification process 133 on AAA host 120e. The AAA server 522 responds to requests for authentication, authorization, and accounting information based on data stored in the user profile data structure 530, as is well known in the art. The user profile data structure holds data that describes the current state of multiple authorized users of the ISP services. In the illustrated embodiment, user profile data structure 530 includes a user profile record 531 for each of multiple users. In the illustrated embodiment, record 531 includes a user identifier field 532, a user payment status field 534, a user password field 536 and other user profile information field 538. The user identifier field 532 holds data that indicates the user ID for a particular user. The user payment status field 534 holds data that indicates the billing status of the user, such as whether the user has paid for a particular service or is in arrears for one or more services for which the user has subscribed. The user password field 536 holds data that indicates the secret password shared only with the user, as described above. The other user profile information field 538 holds data that indicates additional information about the user, if any, which is exploited during authentication, authorization, and accounting services. For example, other user profile information field 538 holds data that indicates ISP services and quality of service to which the user has subscribed.

Although records and fields and data structures like 530 itself are depicted in FIG. 5 and other block diagrams as contiguous areas in a particular order for purposes of illustration, in other embodiments, one or more of the data structures, records and fields, or portions thereof, are stored in a different order or in different areas of storage on one or more devices, or in one or more databases. For example one or more of the data structure 530, record 531 and fields, 532, 534, 536, 538, or portions thereof, are stored in a different order or in different areas of storage on one or more devices, or in one or more databases accessible to AAA server 522.

According to embodiments of the invention, challenge response verification process 524 determines whether a remote user has properly responded to a challenge during authentication, using DHCP messages and the value stored in user password field 536. The process 524 is described in more detail below with reference to FIG. 9.

Although the challenge-response verification process 524 is shown as a separate process from AAA server 522 operating on AAA host 520, in some embodiments, the challenge-response verification process 524 is incorporated within the AAA server 522.

Figure 6:
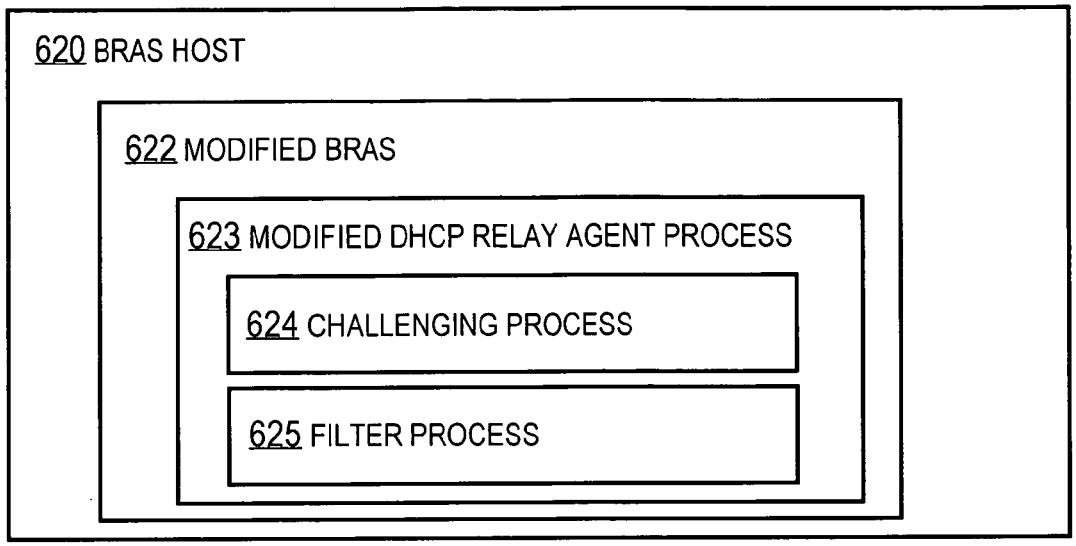
FIG. 6 is a block diagram that illustrates a BRAS host, according to an embodiment.

FIG. 6 is a block diagram that illustrates a BRAS host 620, according to an embodiment. The BRAS host 620 includes a modified BRAS 622 a modified DHCP relay agent process 623, a challenging process 624, such as challenging process 132 on BRAS host 154, and a filter process 625. A DHCP agent executes on an intermediate network node to transfer DHCP messages received on one link of the node to one or more different links on the node, so that a DHCP server need not be on the same network segment as a DHCP client. A network segment is a set of one or more communications links without an intervening intermediate network node. The modified DHCP relay agent 623 is modified from a standard DHCP agent in order to engage challenging process 624. In some embodiments, the modified DHCP relay agent 623 also engages the filter process 625. The filter process 625 executes to determine whether a DHCP message received over a link with the IP network comes from a source that is trusted, as described in more detail below with reference to FIG. 10. For example, filter process 625 executes to determine whether a DHCP message comes from a trusted DHCP server listed on an access control list (ACL) maintained by the relay agent 623. In some embodiments, the filter process 625 is omitted.

In other embodiments, one or both of processes 623, 624 are external to modified BRAS 622 and interact with modified BRAS 622 through an API. In some embodiments, the modified DHCP relay agent process 623 is omitted. In some embodiments, a DHCP server is included in the modified BRAS 622. According to some embodiments of the invention, the modified BRAS 622 is modified in order to engage the challenging process 624 to accomplish authentication using DHCP messages, as described in more detail below with reference to FIG. 10. In the illustrated embodiment, the modified BRAS engages the challenging process indirectly though a modified DHCP agent process 623 that itself is modified to engage the challenging process 624.

Figure 7:
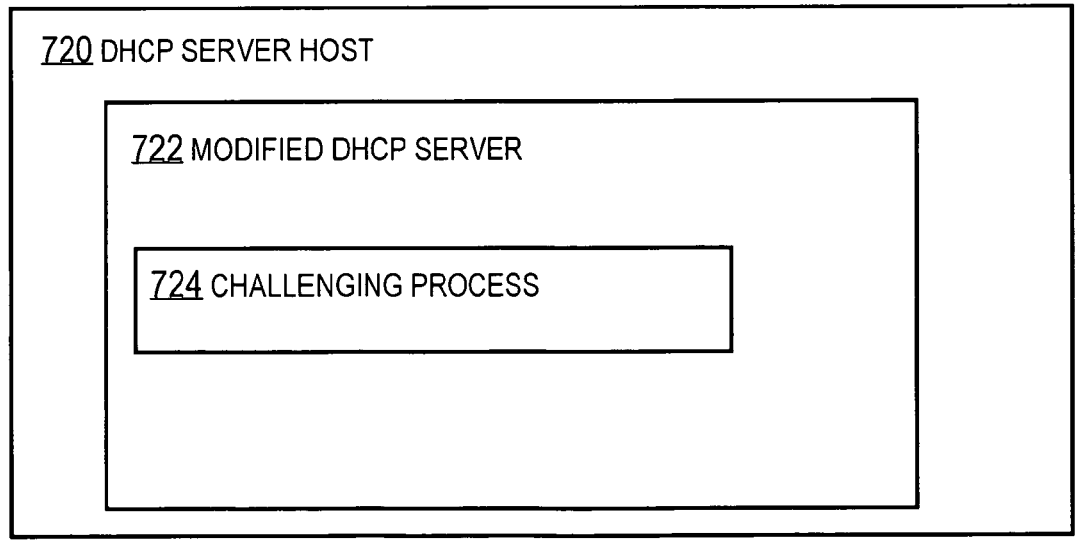
FIG. 7 is a block diagram that illustrates a DHCP server host, according to an embodiment.

FIG. 7 is a block diagram that illustrates a DHCP server host 720, according to an embodiment. The DHCP server host 720 includes a modified DHCP server 722 and a challenging process 724, such as challenging process 134 on DHCP host 120f. In the illustrated embodiment, challenging process 724 is incorporated within modified DHCP server 722. In other embodiments, challenging process 724 is external to modified DHCP server 722 and interacts with modified DHCP server 722 through an API. According to some embodiments of the invention, the modified DHCP server 722 is modified in order to engage the challenging process 624 to accomplish authentication using DHCP messages, as described in more detail below with reference to FIG. 10. Challenging process 724 and challenging process 624 both perform the steps described in FIG. 10, but one or more steps may be implemented differently between challenging process 624 and challenging process 722, as described in more detail below.

3.0 Methods for Authentication Using DHCP

According to various embodiments of the invention, DHCP standards are adapted to allow DHCP messages to support challenge-response authentication, such as used in the Challenge Handshake Authentication Protocol (CHAP). In some embodiments, the challenge-response authentication makes use of user profile data already in an AAA server, such as a RADIUS server.

In a previous approach, CHAP had been implemented at the BRAS in response to a PPP connection between the BRAS and the CPE (e.g., CPE 150 or remote end node 120a). CHAP first requires a challenge value (e.g., a random value) to be sent from the BRAS to the CHAP client on CPE. The challenge value is chosen to be different from all previous challenge values sent to the user and to be unpredictable given any or all previous values. The CHAP client then performs a one-way-hash function on the challenge value appended to a user ID and password (shared-secret) known to both the CHAP client and an AAA server. The one-way hash algorithm used in CHAP is MD5, well known in the art. The result of this hash is sent as a response value to the BRAS. The BRAS, in turn, sends the challenge value and the response value to an AAA server, such as a RADIUS server. The AAA server performs the same calculation with the challenge value and the secret password, verifying whether the response value is correct. If so, a "Success" message (e.g., a RADIUS Access-Accept) is sent from the AAA server to the BRAS, along with any information to be handed to the client, such as an IP address for the client host or a domain name server (DNS) to resolve names of other nodes as corresponding IP addresses, or other information, or some combination. If the response value is incorrect, a "Failure" message is sent (RADIUS Access-Reject) informing the BRAS that this is an invalid password. The BRAS communicates the failure to the CPE using PPP.

DHCP currently has "Option 82" which can be used with RADIUS. Even so, Option 82 does not offer a form of user authentication, but simply an "in-the-clear" user identifier (e.g., analogous to just a "username" with no password or credentials whatsoever). It is highly insecure compared to the methods described herein, and does not fully utilize RADIUS authentication mechanisms. Further, Option 82 is only specified for use with a DHCP relay agent process, and thus has the effect of identifying a particular link, such as a DSL Line, rather than truly authenticating an individual user. Option 82 authorization is independent of the user sitting at an end node, e.g., does not change between a parent and a child using the same end node 120a. Conversely, under Option 82, the user does not necessarily move from one DSL Line to another and receive the same service even if the same user ID and password combination is entered.

The authentication mechanism described herein improves on each of such limitations by (1) allowing the authentication to be tied to the user rather than to the communication link; and (2) allowing a shared-secret based authentication of the user without passing the shared-secret in the clear on any wire.

RFC 3118 defines "Authentication for DHCP Messages," which allows shared-secret based authentication of DHCP messages, but does not (1) add an authentication phase to DHCP before offering DHCP parameters to the client, (2) does not properly integrate with RADIUS CHAP authentication mode in a secure and compatible manner. For example, the subscriber password would be sent in the clear, or with light encryption, between the BRAS and the RADIUS server via an extension to RADIUS. RFC 3118 merely ensures that the DHCP message received is the DHCP message sent by a particular client. RFC 3118 does not ensure that the DHCP client truly belongs to a particular user, nor prevents a user from accessing the IP network before the user is authenticated. Furthermore, RFC 3118 (3) does not allow an explicit on-demand "re-challenge" of the user.

According to an illustrated embodiment of the invention, four new DHCP message types are defined:
1-DHCPAUTH-Challenge
2-DHCPAUTH-Response
3-DHCPAUTH-Success
4-DHCPAUTH-Failure to support a new authentication phase which occurs before a DHCPOFFER or DHCPACK is sent by a BRAS or other network node executing a modified DHCP Server process.

The new DHCP message types may also be used to integrate other authentication methods, including "in the clear" password mechanisms (for example, to support One-Time-Password mechanisms), or to carry other types of authentication, including EAP which, unlike DSL Broadband, is widely used in 802.11 Wi-Fi environments.

The DHCPAUTH messages follow the format for DHCP messages defined in RFC 2131. These new messages are identified by the presence of a DHCP Message Type option 322, which encodes DHCPAUTH message type. For example, a value in DHCP Message Type option field 322 is associated with a DHCPAUTH message type. The DHCP standard should be updated to allow this association. A DHCPAUTH message uses the DHCP Message Type option field 322 to indicate whether the message carries a challenge, response, success or failure by associating four different values for these four types of authentication messages, named DHCPAUTH-Challenge, DHCPAUTH-Response, DHCPAUTH-Success, and DHCPAUTH-Failure messages herein. Other fields in the DHCP message header, such as siaddr and fname, are left unused. In various other embodiments, one or more other fields in the DHCP header (such as the xid field 316) or payload are used to indicate these types of messages in addition to or instead of the fields used in the illustrated embodiment.

The data in a DHCPAUTH message, such as the challenge value or response value, is also carried in a DHCPAUTH option field, such as option field 322. The option type field 323 indicates whether the option field holds a challenge value or a response value or a success message or a failure message. The option length field 324 holds data that indicates the length of the data fields 326 as a number of octets (an octet is eight binary digits called bits). For example, the option type field 323 is eight bits (one octet), the option length field 324 is eight bits (one octet), and the data fields 326 are the next number of octets indicated by the value in the option length field 324.

The data fields 326 are zero or more octets carrying the data specific for the option type. For example, in a DHCPAUTH message (indicated by value in a first DHCP message type option 322), the data for a second option 322, a DHCP challenge or response option (indicated by a value in the option type field 323) includes a CHAP Value and a CHAP Name in the data fields 326. To distinguish the CHAP Name from the CHAP Value, a Value Size field is included in the data fields 326. For example, the first eight bits of the data fields 326 represent the Value Size field, the next octets equal in number to the value in the Value Size field represent the CHAP Value, and the remaining octets in the data fields 326 (=option length−8−Value Size) hold data indicating the CHAP Name. The CHAP name is used to distinguish among several challenges that a challenging process may have issued before all responses are resolved. CHAP name refers to the name of the challenger or the name of the responder, or both. In a typical CHAP sequence, a challenging device A-NAME sends a CHAP challenge with "A-NAME" in the CHAP Name field to a client device or user ID, e.g., A-JOE. The responder can use this name to select a password or prompt the user. After computing the response, the reply message will contain the response value alongside "A-JOE" in the CHAP Name field. The value in the CHAP Name is then used by the authenticating server to complete the authentication computation.

For example. In an illustrated embodiment, the Value field is one or more octets, in which the most significant octet is transmitted first. A challenge Value is a variable stream of octets. The importance of the uniqueness of the challenge Value and its relationship to the secret is described above. The challenge Value is changed each time a challenge is sent. The length of the challenge Value depends upon the method used to generate the octets, and is independent of the hash algorithm used. A response Value is the one-way hash calculated over a stream of octets consisting of a user ID, followed by (concatenated with) the "secret" password, followed by (concatenated with) the challenge Value. The length of the response Value depends upon the hash algorithm used (16 octets for MD5). In other embodiments, other secure functions are used in addition to or in place of the MD5 one-way hash. A secure function is one for which it is impractical to deduce the secret password even with knowledge of the function, the challenge value and the response value.

The CHAP Name field is one or more octets representing the identification of the system transmitting the packet. There are no limitations on the content of this field. For example, it may contain ASCII character strings or globally unique identifiers in ASN.1 syntax. The CHAP Name should not be null or terminated by a carriage return line feed (CR/LF) pair of characters. The size is determined from the Length field.

For a DHCPAUTH Success or Failure message, as indicated by the data in the DHCP option type field 323, the data fields 326 include octets that represent characters that express a message to be displayed to a user. In an illustrated embodiment, the message expressed in the data fields 326 is zero or more octets, and their contents are implementation dependent. It is intended to be human readable, and is not to affect operation of the protocol. It is recommended that the message contain displayable ASCII characters 32 through 126 decimal. Mechanisms for extension to other character sets may be used in other embodiments. The size is determined from the option length field 324. This message field can be used to send message to clients. An Example is "Your account has expired, please call xxxx" where xxx indicates a customer service contact number.

In some embodiments, a DHCPAUTH-Protocol option is defined to specify the challenge process and one-way hash or other secure algorithm to be used by the client in the challenge-response authentication. The Protocol option is in the form of DHCP data option 322, with a value in the option type field 323 that represents a DHCPAUTH-Protocol type, as agreed to in a modified DHCP standard, and a length that is 3 octets in an illustrated embodiment. In this embodiment, the data fields 326 include two fields: a two-octet authentication field with a value that is expressed as c223 in hexadecimal to indicate CHAP; and a one-octet algorithm field that indicates the one-way hash algorithm to be used by the CHAP. Allowed values are specified in an "Assigned Numbers" portion of a modified DHCP standard. For example, the value 5 indicates CHAP with MD5 using passwords at an AAA server and the value 6 indicates SHA-256. SHA-256 uses 256 bit shared secret keys and is even more secure than MD5. In other embodiments, other secure functions are used, e.g., SHA-512, commonly known as the SHA-2 family, and appropriate values are added to the Assigned Numbers to designate such functions. In some embodiments the challenging process includes in the DHCP AUTH Challenge message a list of hash functions that the AAA server allows. In some such embodiments, the client chooses among the hash functions on the list—typically choosing the most secure that is implemented at the client node. This list is also presented through a new DHCP option in the DHCPAUTH Challenge message.

3.1 Methods on DHCP Client Host

In order to facilitate simple deployment on millions of operational hosts serving as CPE 150, the illustrated embodiment is designed, from the perspective of the client, to be a simple, event driven, "request received, response sent" type exchange with no persistent state necessary. Put simply, in some embodiments, any DHCPAUTH-Challenge message that is received at anytime by the DHCP client is responded to with a DHCPAUTH-Response message. These embodiments allow re-authentication to take place at any time.

In some of these embodiments, any DHCPAUTH-Failure message that is received is responded to by presenting to the user that a failure occurred. For example, a graphical user interface is used to present data that indicates an incorrect password was entered. Reinitializing or halting of the DHCP client (e.g., a DHCP state machine) should follow a DHCP-AUTH-Result message indicating a failure.

A DHCPAUTH-Success message is responded to in some embodiments by indicating to the user that success has occurred. In some embodiments nothing is done except to allow standard DHCP processing to continue. All standard DHCP client protocol states and operations remain unchanged FIG. 8 is a flow diagram that illustrates a method 800 at a DHCP client host, according to an embodiment. The DHCP client 422 is modified to engage challenge-response client 424 in response to a DHCP challenge message. Challenge-response client 424 responds to the DHCP challenge message with a DHCP response message based on the value in password field 425.

Figure 8:
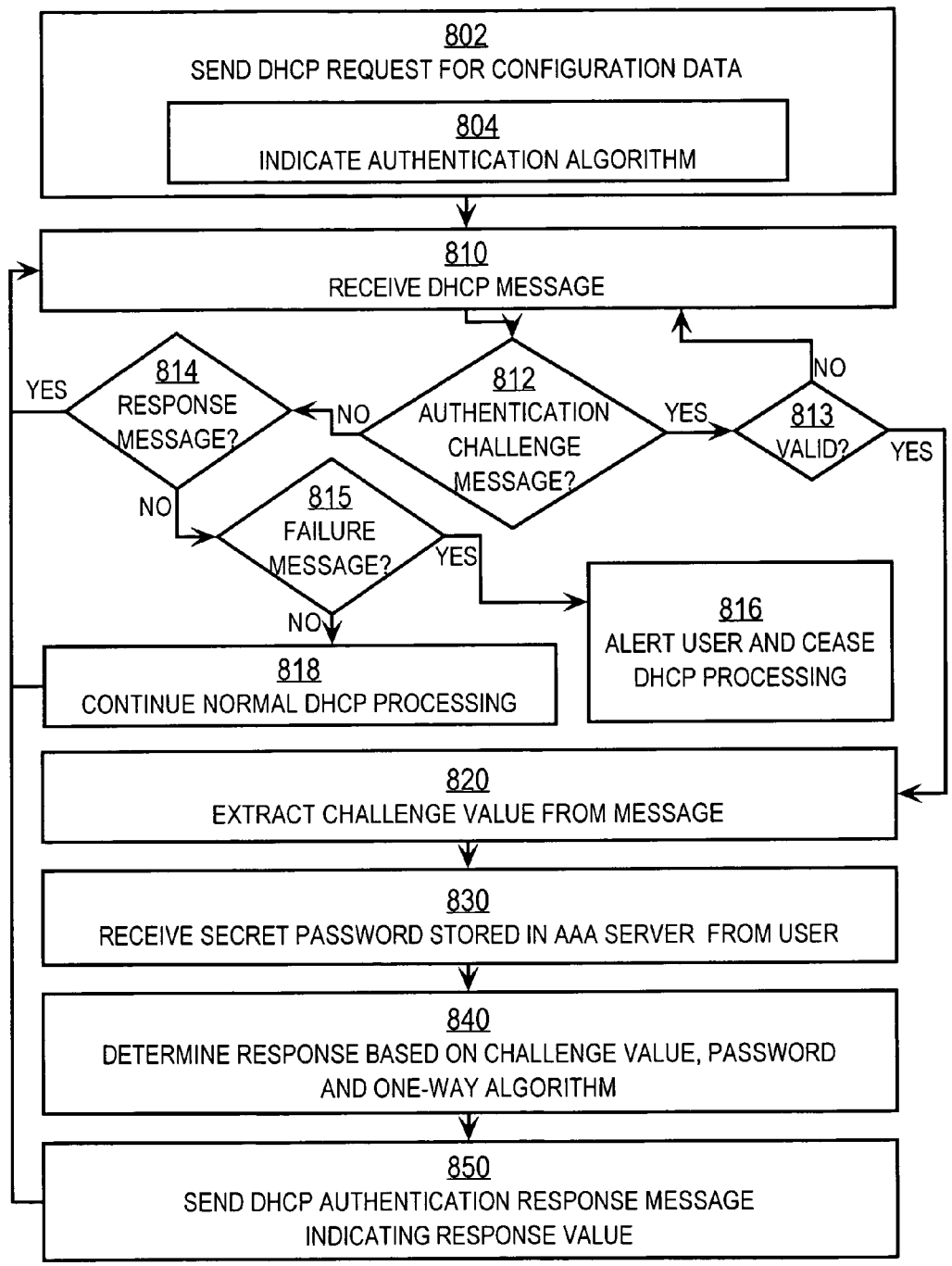
FIG. 8 is a flow diagram that illustrates a method at a DHCP client host, according to an embodiment.

Although steps are shown in FIG. 8 and subsequent flow diagrams in a particular order for purposes of illustration, in other embodiments the steps may be performed in a different order or overlapping in time or one or more steps may be omitted or the steps may be changed in some combination of ways.

In step 802, a DHCP request message, such as a DHCP DISCOVER message, is sent for configuration data as a request from a user DHCP client on a user end node so that the user end node (e.g., end node 120a) can communicate using IP with a remote IP network (e.g., IP network 110d). In order to replace PPP authentication, it is desirable that the DHCP request initiate an authentication process that is successfully resolved before any DHCP offer of configuration data, including an IP address, is received at the user end node.

In some embodiments, the DHCP authentication process is initiated independently of action by the end user host processes (e.g., to be re-authenticated after a certain period of time), and step 802 is omitted.

In some embodiments, step 802 includes step 804 to indicate the authentication algorithm to be used. For example the DHCPAUTH-Protocol option, described above, is included in the DHCP request. In an illustrated embodiment, the DHCPAUTH-Protocol option indicates CHAP is to be used for authentication, using MD5 as the one way hash function.

In step 810 a DHCP message is received. Any DHCP message received at an end user host (e.g., end node 120a) is passed to the DHCP client 422 on that host. In the illustrated embodiments all DHCP messages are passed by the modified DHCP client 422 to the challenge-response client 424. In some embodiments, the modified DHCP client 422 first determines if the message type is a DHCPAUTH type, and if so, then passes the message to the challenge-response client 424.

In step 812 it is determined whether the DHCP message is an authentication challenge message. It is determined by challenge response client 424 that the DHCP message is DHCPAUTH Challenge type based on a value in DHCP Message Type option field 322.

If it is determined that the DHCP message is an authentication challenge message, then control passes to step 813, described in more detail below. If it is determined that the DHCP message is not an authentication challenge message, control passes to step 814.

In step 814 it is determined whether the DHCP message is an authentication response message. It is determined by challenge response client 424 that the DHCP message is DHCP-AUTH Response type based on a value in DHCP Message Type option field 322. In the illustrated embodiment, DHCP authentication response messages are ignored by the challenge-response client, and control passes back to step 810 to get the next DHCP message if the DHCP message is a DHCP authentication response message. If it is determined in step 814 that the DHCP message is not an authentication response message, then control passes to step 815.

In step 815, it is determined whether the message is a DHCP authentication failure message. It is determined by challenge response client 424 that the DHCP message is DHCPAUTH Failure type based on a value in DHCP Message Type option field 322. If the message is a DHCP failure message, control passes to step 816. In step 816, the user is alerted to the failure and further DHCP processing is halted. In the illustrated embodiment this occurs by passing the message and appropriate values to the DHCP client through the API. For example, the characters in the option fields 326 and a command to display them are passed to the DHCP state machine. Then a command to inactivate the DHCP state machine is passed and the DHCP client is put in an inactive state.

If it is determined in step 815 that the message is not a DHCP authentication failure message, then control passes to step 818. The DHCP message might be a DHCP authentication success message or some non-authentication message. In step 818, normal DHCP processing occurs. For example, control is returned to the DHCP client through the API. In some embodiments, it is determined by challenge response client 424 that the DHCP message is DHCPAUTH Success type based on a value in DHCP Message Type option field 322; and a message is displayed to the user based on contents of the data option fields 326 in the success message. In some embodiments, a DHCP message that is not a DHCPAUTH message is returned through the API to be processed normally by the DHCP client. For example, one or more DHCP OFFER messages are received and passed back to the DHCP client for the DHCP client to process and to select one. The selected offer provides an IP address to the end node and allows the node to begin unicast communication with other nodes using IP. Control typically returns to step 810 to await receipt of another DHCP message, as in the illustrated embodiment. For example, a DHCP client implemented as a state machine returns to an active state.

If it is determined in step 812 that a DHCP authentication challenge message is received, control passes to step 813. In step 813, it is determined whether the challenge is valid. In some embodiments, step 813 is omitted. In some embodiments, step 813 is included to provide extra security. The extra security is warranted because one-way CHAP assures the gateway to the IP network (e.g., the BRAS) that the client is authentic, it does not assure the client of anything. The client may be subjected to spurious or malicious challenges. The steps to determine whether a challenge (or response) is valid are described in more detail in the next section. In some embodiments, the client issues a DHCP challenge to the remote access server or sending node and does not correspond further until a response is received and verified.

If it is determined in step 813 that the challenge or response message is not valid, the message is ignored and control passes back to step 810 to deal with the next DHCP message. If it is determined in step 813 that the challenge or response message is valid, control passes to step 820.

In step 820, a challenge value is extracted from the message. For example, the challenge value is extracted from the data fields 326 in a DHCPAUTH-Challenge message, after a Value Size field and before a CHAP Name field. It is a property of the challenge value that a current challenge value is not a repeat of any previous challenge value and the current challenge value can not be predicted by knowledge of any number of previous challenge values.

In step 830, a secret password shared with an AAA server is received from the user. Any secure method may be used to perform this function. For example, a prompt is presented to the user on a display device for end node 120a; and the password is keyed in by the user and received by the challenge-response client process. In some embodiments, a portable device in possession of the user stores the password and communicates the password when the device is physically connected directly to the DHCP client host.

In step 840, a response value is determined based on the challenge value, the password, and the one-way algorithm. The determination of a response value uses a secure process that renders impractical an attempt to derive the password value from the challenge value and the response value. In the illustrated embodiment an MD5 one-way hash is used as the one way algorithm operating on an input generated by concatenating a user ID, the password, and the challenge value. In other embodiments, other one way or otherwise secure functions are used and other combinations of challenge value and password and other data are input to the secure function. Whatever secure function and combination to produce input is used, it must be used by both the challenge-response client and by a process that verifies the client's response. In the some embodiments, this agreement is accomplished by indicating the one-way function in the DHCPAUTH-Protocol option included in a DHCP DISCOVER, as described above with respect to step 804.

In step 850, the response value is included in a DHCP authentication response message that is sent to the source of the DHCP challenge message. For example, a DHCPAUTH Response message is sent during step 850 which holds the response value in the data fields 326, after a Value Size field and before a CHAP Name field. In some embodiments the DHCP authentication response message includes the challenge value also. For example, in some embodiments a DHCPAUTH-Response message includes one DHCP data option 322 for the response value and a second DHCP data option 322 for the challenge value. In some embodiments, the DHCPAUTH-Protocol option is included as a second or third DHCP data option 322 in the response message to notify a verification process how the challenge value was used.

3.2 Enhanced Security on DHCP Client Host

The MD5 hash algorithm used in CHAP is known to have a number of weaknesses that enable an attacker to derive the client secret password using a type of attack known as a brute force birthday attack. This attack in essence consists of the attacker repeatedly issuing an authentication challenge to a client and observing the response. Given a sufficient number of such challenges and observed responses, the attacker may be able to determine a key that for all intents and purposes results in the same MD5 hash value as the victim's secret password would produce, i.e. the attacker is able to derive the victim's secret password, or one that behaves like it.

In some embodiments, it is assumed that only communication at Layer 2 occurs between the client and a challenging process at the BRAS, with user-user communication provided across one or more routed Layer 3 IP hops.

Unlike a basic PPP exchange, DHCP packets including DHCPAUTH messages may be freely routed by IP routers across multiple hops. If the DHCPAUTH client is obliged to respond to any challenge, it is conceivable that a remote rogue user may try to exploit the known MD5 weakness to derive the secret password of another user through the use of the brute force birthday attack. It is thus sensible to provide some basic means of protection to the client by relying on a trusted L2 network between the client and BRAS (e.g., access network 110c is under control of the ISP).

In some embodiments, challenges are only considered valid if they traverse only one network segment (i.e., pass through no intervening intermediate network nodes). This prevents malicious IP users on IP network 110d from issuing valid challenges. In some of these embodiments, the single segment requirement is enforced using the IP Time-to-Live (TTL) field, which is set by the originator of a message and decremented by each intermediate network node. The maximum value for this field is 255. Thus a challenge can be assured to be issued on the same segment if the challenger inserts a value of 255 in the TTL field and the challenge arrives with the value 255 in that field. In such embodiments, step 813 includes determining whether the TTL field of the received challenge is equal to 255. In some such embodiments, the challenging process is required to execute on an intermediate network node on the same network segment as the CPE.

This method does not close off a number of threats against the client and BRAS, but provides an equivalent of the current PPPoE authentication security. This method can also be combined with a modification to the relay agent that restricts the relay agent from forwarding DHCPAUTH messages from external DHCP servers, which ensures that any DHCPAUTH messages received by the DHCP client were originated in the BRAS.

In some embodiments, a DHCP authentication challenge is considered valid only if it is the first received after a DHCP DISCOVER issued by the DHCP client. In some such embodiments, after a request, the challenge-response client is put in a challenge-enabled state. When in the challenge-enabled state, the client determines during step 813 that any DHCP authentication challenge message sent to it is valid. The challenge-response client is put in a challenge-disabled state after successfully authenticating and obtaining a DHCP address, for the duration of the DHCP lease. In such a challenge-disabled state, the client determines during step 813 that any DHCP authentication challenge message sent to it is not valid. The challenge-response state is changed to challenge-enabled again when the client enters the DHCPRENEW state; and changed once again to challenge-disabled after renewal.

In some embodiments, a DHCP authentication challenge is considered valid only if received at a reasonable rate less than some rate limit. In some such embodiments, after a challenge, the challenge-response client is put in a challenge-disabled state. When in the challenge-disabled state, the client determines during step 813 that any DHCP authentication challenge message sent to it is not valid. The challenge-response client is put in a challenge-enabled state after a time based on the rate limit. In such a challenge-enabled state, the client determines during step 813 that any DHCP authentication challenge message sent to it is valid.

In some embodiments a hash function used with CHAP is different than MD5, for example, a one-way function that produces a 256 bit hash value is used, which is less susceptible to a brute force attack. For such a function, an input octet string may need to be padded with zeros or other characters to provide sufficient number of input octets to feed the 256 bit hash value. PPP clients have traditionally used MD5 as a legacy protocol, and migrating to a newer one was not done on a wide scale for backward compatibility reasons. Thus such embodiments offer more security than legacy PPP authentication.

3.3 Methods on AAA Server Host

Figure 9:
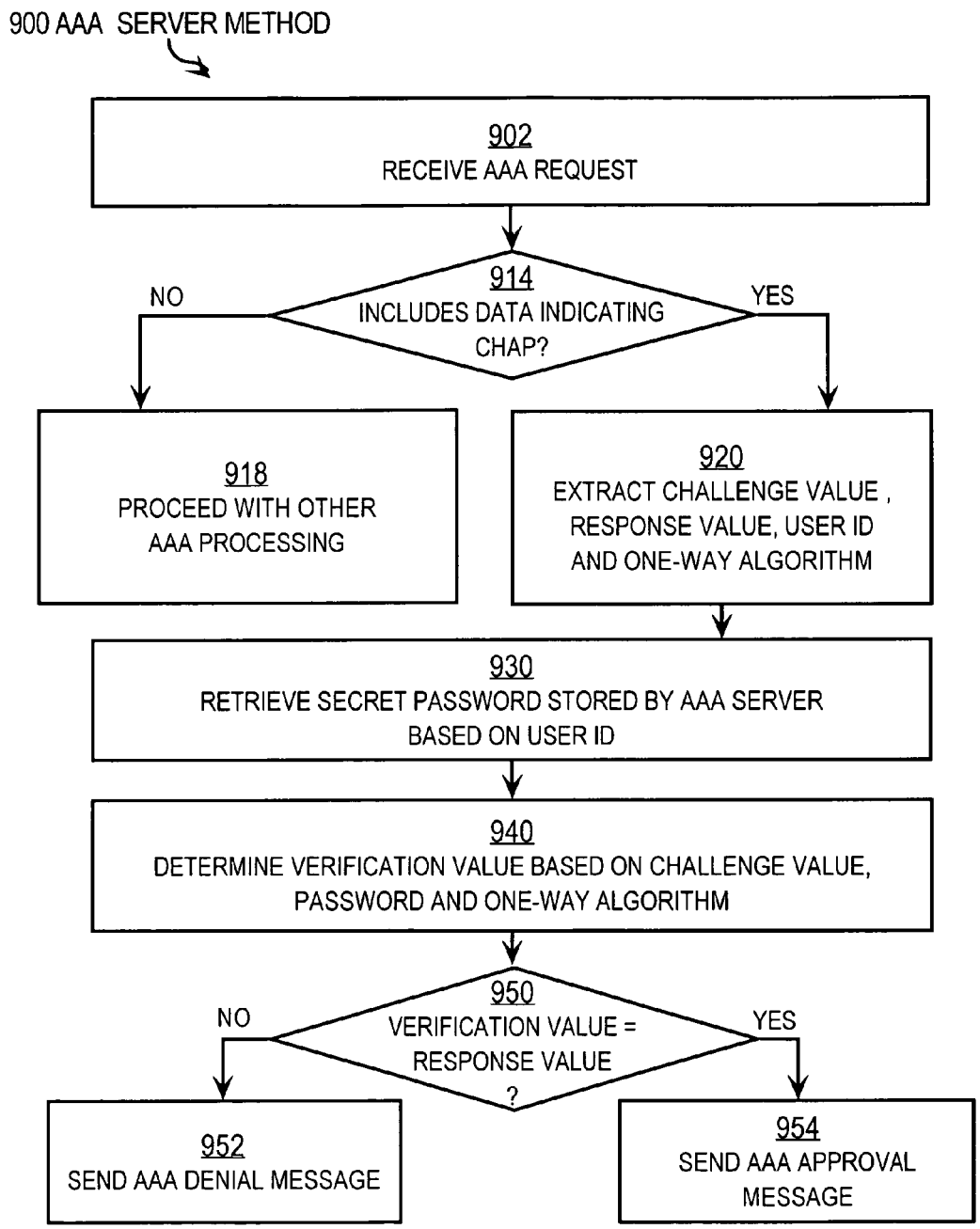
FIG. 9 is a flow diagram that illustrates a method at a AAA server host, according to an embodiment.

FIG. 9 is a flow diagram that illustrates a method 900 at an AAA server host, according to an embodiment, such as verification process 133 on AAA host 120e. In an illustrated embodiment, the AAA server is a RADIUS Server.

In step 902 an AAA request message is received. For example, a RADIUS Access Request message is received.

In step 914 it is determined whether the request message includes CHAP data, e.g., such as a CHAP Name. If not, control passes to step 918. In step 918, non-CHAP AAA processing is performed.

If it is determined in step 914 that the request message includes CHAP data, then control passes to step 920. In step 920, data is extracted from the message that indicates a challenge value, a response value, a user identifier, and a one-way algorithm. In some embodiments, a default one-way algorithm is known and is not indicated by data in the message. For example, a challenge value, a response value and a user identifier are extracted from a RADIUS request message.

In step 930, a secret password stored at the AAA server is retrieved based on the user identifier.

In step 940, a verification value is determined based on the challenge value, the password, and the one-way algorithm. The determination of the verification value uses the same secure process that renders impractical an attempt to derive the password value from the challenge value and the response value. In the illustrated embodiment an MD5 hash function is used as the one way algorithm operating on an input generated by concatenating the user ID, the password, and the challenge value. As described above for the response value, in other embodiments, other one way functions are used and other combinations of challenge value and password and other data are input to the one-way function. Whatever one-way function and combination to produce input is used, it must be used by both the challenge-response client and by step 940. In the illustrated embodiment, this agreement is accomplished by indicating the algorithm in the RADIUS request message.

In step 950, it is determined whether the verification value just determined in step 940 agrees with the response value extracted from the AAA request message during step 920. If not, then the response is not verified and the user is not authenticated and control passes to step 952 to send an AAA denial message. For example, a RADIUS Access Reject message is sent in step 952.

If it is determined in step 950 that the verification value agrees with the response value, then the response is verified and the user is authenticated. Control passes to step 954. In step 954 an AAA approval message is formed that, in some embodiments, includes at least some user profile information for the authenticated user or BRAS or both from the AAA user profile data structure 530, such as an account balance and a list of services subscribed to. The approval message is sent to the source of the AAA request received in step 902. For example, a RADIUS Access Accept message is sent in step 954 to BRAS.

3.4 Methods at Challenger

Figure 10:
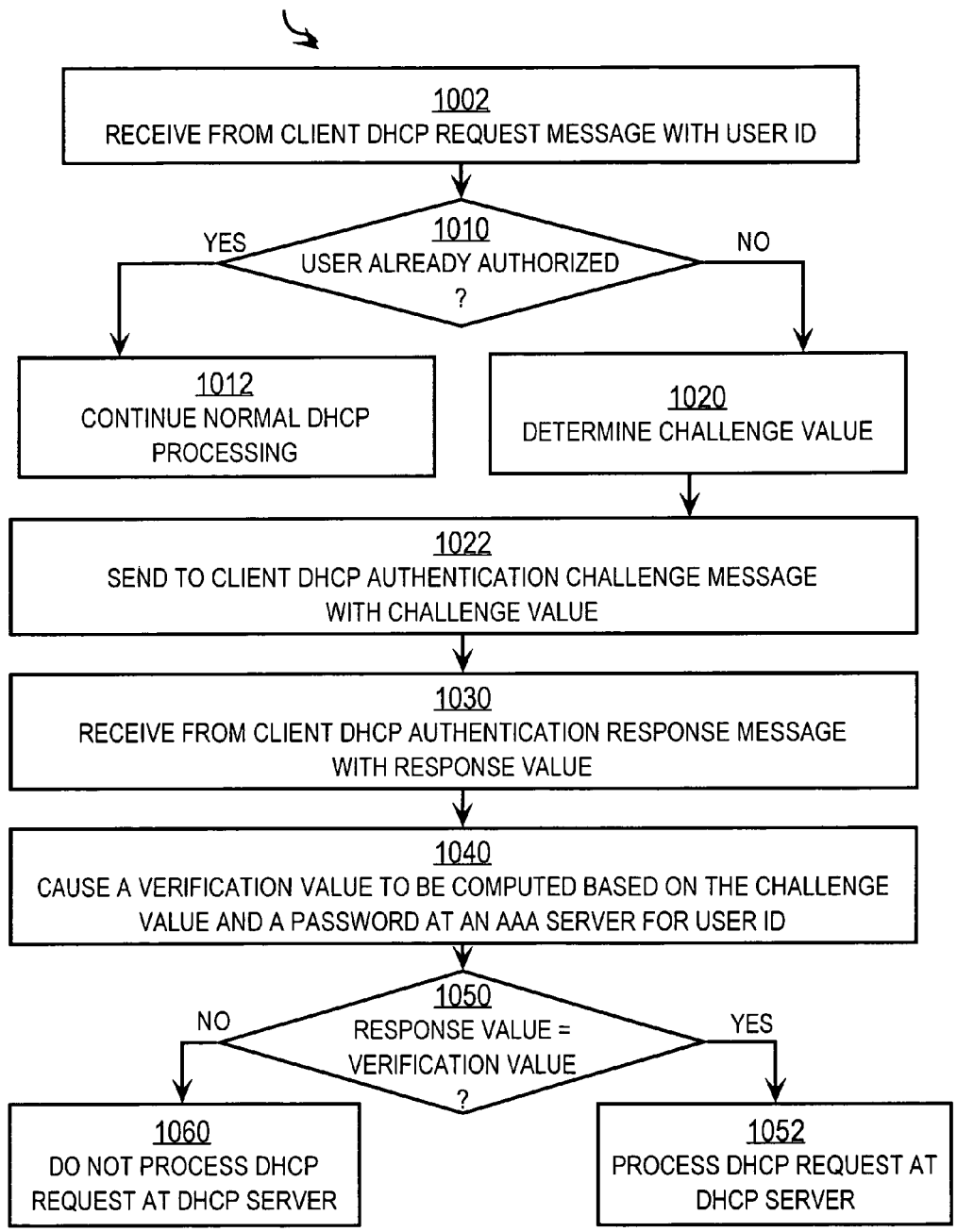
FIG. 10 is a flow diagram that illustrates a method at a challenging process, such as at a DHCP server host or a BRAS host, according to an embodiment.

FIG. 10 is a flow diagram that illustrates a method 1000 at a challenging process, such as at DHCP server or a BRAS or an AAA server, according to an embodiment. For example, in some embodiments, process 1000 is executed by challenging process 132 on BRAS host 154 and in some embodiments process 1000 is executed by challenging process 134 on DHCP server host 120f. In some embodiments, process 1000 is executed at a DHCP relay agent. In some embodiments, process 1000 is executed at a modified AAA server host (e.g. end node 120e). In some embodiments, process 1000 is spread across different platforms, such as a combination of BRAS host 154, DHCP host 120f, and one or more other intermediate network nodes.

In step 1002, a DHCP DISCOVER or RENEWAL message is received as a request from a DHCP client. The DHCP DISCOVER or RENEWAL message includes data that indicates a user identifier (user ID). For example a DHCP DISCOVER message is received from a DHCP client on end node 120a that indicates the user is "UserA." In some embodiments, the DHCP DISCOVER message also includes a DHCPAUTH Protocol data option.

In step 1010, it is determined whether the user ID is already authenticated for a current DHCP configuration lease. If so, control passes to step 1012 to continue normal DHCP processing. For example, if the method is executed by a modified BRAS, then during step 1012 the DHCP message is forwarded to the appropriate DHCP server or relay agent if the user already has a source IP address. If the method is executed by a modified DHCP server, then the DHCP message is processed at that server. It is assumed for purposes of illustration that UserA is not authenticated for any current DHCP lease of configuration properties, e.g., there is no IP address associated with UserA.

If it is determined in step 1010 that the user ID or IP address is not already authenticated for any current DHCP configuration lease, then control passes to step 1020. In step 1020 a challenge value is determined. The challenger value is determined so that it is different from any previous challenge value sent to that user, and so that a current challenge value can not be predicted by knowledge of any, some or all previous challenge values. This way, no malicious party can snoop previous challenge and response messages to determine a proper response for a subsequent challenge value. Control passes to step 1022.

In embodiments in which the method 1000 is executed within a modified DHCP server, the DHCP server goes into an authentication state during which no DHCP offer is sent in response to the DHCP request received in step 1002. For example, DHCP server goes into an authentication state during which no DHCP offer is sent in response to the DHCP request received in step 1002 from UserA.

In step 1022 a DHCP authentication challenge message is sent to the DHCP client that is the source of the DHCP request received in step 1002. This is done by sending the challenge as a broadcast on the same link as received the DHCP DISCOVER message with a null source IP address. The DHCP authentication challenge message includes the challenge value. For example, a DHCPAUTH-Challenge message with the challenge value in the data fields 326 for a data option 322 of option type challenge value is sent on a link between BRAS 154 and CPE 150 and forwarded by DHCP relay agents, as necessary, until it reaches the DHCP client executing on end node 120a.

In some embodiments, during step 1022, it is determined whether a response to the challenge message is received within a certain time. If not, then the challenge message is sent again. In some embodiments in which the method 1000 is executed at the DHCP server, the DHCP server ignores the request and moves out of the authorization state if a response is not received within a certain time.

In some embodiments, the DHCP authentication challenge message is sent during step 1022 so that challenge-response client determines the challenge is valid, as described above for step 813. In some embodiments, the challenging process operates on an intermediate network node on the same network segment as the host for the challenge-response client; and during step 1022 inserts the value 255 in the TTL field. In some embodiments, a DHCP relay agent on the intermediate network node on the same network segment as the host for the challenge-response client is modified to insert the value 255 into the TTL field in all messages received from a trusted source, such as the host for the BRAS. In some embodiments, in which the challenging process does not operate on the BRAS but instead operates on another node of the IP network (e.g., network 110d) such as the DHCP server host 120f, the BRAS is modified to execute the filter process 625 which uses an access control list (ACL) or similar filter to only pass DHCP messages to the access network (e.g., network 110c) from certain trusted sources on the IP network.

In step 1030, a DHCP authentication response message is received from the modified DHCP client executing method 800 in response to the DHCP authentication challenge. The DHCP authentication response message includes data that indicates a response value. For example, a DHCPAUTH-Response message with a response value is received from the modified DHCP client on end node 120a using the challenge-response client 131.

In step 1040, the challenging process causes a verification value to be computed based on the challenge value and a password at an AAA server for the user ID. For example, in some embodiments, the challenging process 132 on BRAS host 154 sends a RADIUS Access Request to the verification process 133 on AAA host 120e during step 1040. In some other embodiments, the challenging process 134 on DHCP host 120f sends a RADIUS Access Request to the verification process 133 on AAA host 120e during step 1040. In some embodiments in which method 1000 executes on AAA host 120e, the password is retrieved from the AAA user profile data structure based on the user ID (e.g., UserA) and used with the user ID and the challenge value to compute the verification value, as described above for step 940. In some embodiments in which method 1000 executes on a DHCP host that does not interface with an AAA host 120e, the password is retrieved from a DHCP user profile data structure.

In step 1050 it is determined whether the response value equals the verification value. For example, in some embodiments, the challenging process 132 on BRAS host 154 determines whether a RADIUS Access Accept message is received from the verification process 133 on AAA host 120e during step 1050. In some other embodiments, the challenging process 134 on DHCP host 120f determines whether a RADIUS Access Accept message is received from the verification process 133 on AAA host 120e during step 1050. In either such embodiment, if a RADIUS Access Denial message is received from the verification process 133, then it is determined that the response value does not equal the verification value during step 1050. In some embodiments in which method 1000 executes on AAA host 120e, the comparison is made directly, as described above for step 950.

If it is determined in step 1050 that the response value equals the verification value, then control passes to step 1052 to process the DHCP request at the DHCP server. For example, in some embodiments, the challenging process 132 on BRAS host 154 forwards the DHCP request received in step 1002 to the DHCP server on host 120f during step 1052. In some other embodiments, during step 1052, the challenging process 134 on DHCP host 120f ends; and the DHCP server exits from the authorization state, and processes the DHCP request received in step 1002. In some embodiments in which method 1000 executes on AAA host 120e, the DHCP request received in step 1002 is forwarded to the DHCP server on host 120f during step 1052.

In some embodiments, a DHCPAUTH-Success message is also sent during step 1052. For example, in various embodiments, the challenging process 132 on BRAS host 154 or the verification process on AAA host 120e generates and sends the DHCPAUTH-Success message to the modified DHCP client on host 120a during step 1052.

If it is determined in step 1050 that the response value does not equal the verification value, then control passes to step 1060 prevent a DHCP offer from being sent to the DHCP client in response to the DHCP request. For example, in some embodiments, the challenging process 132 on BRAS host 154 drops the DHCP DISCOVER or DHCP RENEWAL received during step 1002 and does not forward the DHCP DISCOVER or DHCP RENEWAL to the DHCP server on host 120f. In some other embodiments, during step 1052, the challenging process 134 on DHCP host 120f ends; and the DHCP server also ends. In some embodiments in which method 1000 executes on AAA host 120e, the DHCP DISCOVER message received in step 1002 is dropped without forwarding the DHCP DISCOVER to the DHCP server on host 120f.

In some embodiments, a DHCPAUTH-Failure message is also sent during step 1060. For example, in various embodiments, the challenging process 132 on BRAS host 154 or the verification process on AAA host 120e generates and sends the DHCPAUTH-Failure message to the modified DHCP client for processing by the challenge-response client 131 on end node 120a.

Using these methods, without resorting to PPP authentication, an unauthorized user seeking an IP address from a DHCP server is not granted an IP address and is not permitted access to IP network 110d.

4.0 Implementation Mechanisms—Hardware Overview

Figure 11:
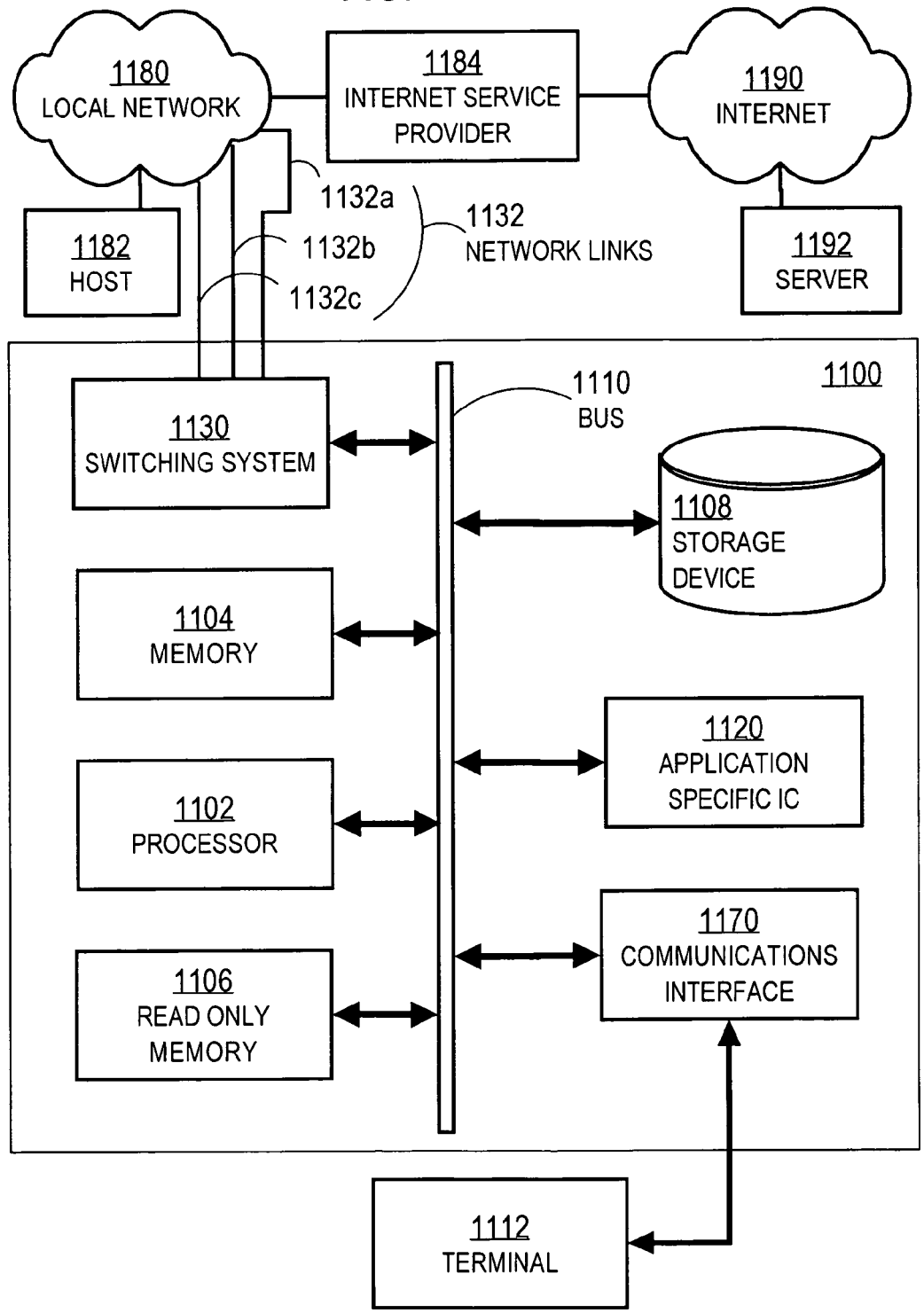
FIG. 11 is a block diagram that illustrates a computer system configured as an intermediate network node upon which an embodiment of the invention may be implemented.

FIG. 11 is a block diagram that illustrates a computer system 1100 upon which an embodiment of the invention may be implemented. The preferred embodiment is implemented using one or more computer programs running on a network node such as a router device. Thus, in this embodiment, the computer system 1100 is a network node.

Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitute computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 1110 for use by the processor from an external terminal 1112, such as a terminal with a keyboard containing alphanumeric keys operated by a human user, or a sensor. A sensor detects conditions in its vicinity and transforms those detections into signals compatible with the signals used to represent information in computer system 1100. Other external components of terminal 1112 coupled to bus 1110, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 1112. In some embodiments, terminal 1112 is omitted.

Computer system 1100 also includes one or more instances of a communications interface 1170 coupled to bus 1110. Communication interface 1170 provides a two-way communication coupling to a variety of external devices that operate with their own processors, such as printers, scanners, external disks, and terminal 1112. Firmware or software running in the computer system 1100 provides a terminal interface or character-based command interface so that external commands can be given to the computer system. For example, communication interface 1170 may be a parallel port or a serial port such as an RS-232 or RS-422 interface, or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1100 includes switching system 1130 as special purpose hardware for switching information for flow over a network. Switching system 1130 typically includes multiple communications interfaces, such as communications interface 1170, for coupling to multiple other devices. In general, each coupling is with a network link 1132 that is connected to another device in or attached to a network, such as local network 1180 in the illustrated embodiment, to which a variety of external devices with their own processors are connected. In some embodiments an input interface or an output interface or both are linked to each of one or more external network elements. Although three network links 1132a, 1132b, 1132c are included in network links 1132 in the illustrated embodiment, in other embodiments, more or fewer links are connected to switching system 1130. Network links 1132 typically provides information communication through one or more networks to other devices that use or process the information. For example, network link 1132b may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides routing information for use with switching system 1130.

The switching system 1130 includes logic and circuitry configured to perform switching functions associated with passing information among elements of network 1180, including passing information received along one network link, e.g. 1132a, as output on the same or different network link, e.g., 1132c. The switching system 1130 switches information traffic arriving on an input interface to an output interface according to pre-determined protocols and conventions that are well known. In some embodiments, switching system 1130 includes its own processor and memory to perform some of the switching functions in software. In some embodiments, switching system 1130 relies on processor 1102, memory 1104, ROM 1106, storage 1108, or some combination, to perform one or more switching functions in software. For example, switching system 1130, in cooperation with processor 1104 implementing a particular protocol, can determine a destination of a packet of data arriving on input interface on link 1132a and send it to the correct destination using output interface on link 1132c. The destinations may include host 1182, server 1192, other terminal devices connected to local network 1180 or Internet 1190, or other routing and switching devices in local network 1180 or Internet 1190.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120 and circuits in switching system 1130, may be used in place of or in combination with software to implement the invention. Thus, embodiments of the invention are not limited to any specific combination of hardware and software.

The signals transmitted over network link 1132 and other networks through communications interfaces such as interface 1170, which carry information to and from computer system 1100, are exemplary forms of carrier waves. Computer system 1100 can send and receive information, including program code, through the networks 1180, 1190 among others, through network links 1132 and communications interfaces such as interface 1170. In an example using the Internet 1190, a server 1192 transmits program code for a particular application, requested by a message sent from computer 1100, through Internet 1190, ISP equipment 1184, local network 1180 and network link 1132b through communications interface in switching system 1130. The received code may be executed by processor 1102 or switching system 1130 as it is received, or may be stored in storage device 1108 or other non-volatile storage for later execution, or both. In this manner, computer system 1100 may obtain application program code in the form of a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to an infra-red signal, a carrier wave serving as the network link 1132b. An infrared detector serving as communications interface in switching system 1130 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102 or switching system 1130.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for authenticating a user for access to a service provider network comprising:

receiving, at a challenging process on a provider network node on a service provider premises from a customer network node on a customer premises different from the service provider premises, a Dynamic Host Configuration Protocol (DHCP) request for configuration data necessary to receive a unicast on an Internet Protocol (IP) network, wherein the DHCP request includes user identifier data that indicates a particular user identifier value;

determining a current challenge value that can not be predicted by knowledge of any previous challenge value;

sending to the customer network node a challenge message that includes the current challenge value;

receiving from the customer network node a response message that includes a response value;

causing a verification value to be determined based on a particular password value, associated with the user identifier value in an Authentication, Authorization and Accounting (AAA) server and the current challenge value using a secure process that renders impractical an attempt to derive the particular password value from the challenge value and the verification value;

determining whether the response value matches the verification value;

if it is determined that the response value does not match the verification value, then preventing a DHCP offer from being sent to the customer network node in response to the DHCP request, whereby unicast communication over the IP network by the customer network node is prevented; and wherein at least one of the challenge message and the response message is formatted according to a DHCP message format using a unique value for a DHCP message type option.

2. A method as recited in claim 1, further comprising, if it is determined that the response value matches the verification value, then causing the DHCP offer to be sent to the customer network node in response to the DHCP request, whereby unicast communication over the IP network by the customer network node is permitted.

3. A method as recited in claim 1, wherein the provider network node is a host for the AAA process.

4. A method as recited in claim 1, wherein the provider node executes a broadband remote access server (BRAS) for serving as a gateway between an internetwork and access network connected to multiple customer premises.

5. A method as recited in claim 4, wherein the challenging process is part of the BRAS.

6. A method as recited in claim 1, wherein at least one of the challenge message and the response message is formatted according to Extensible Authentication Protocol (EAP) for use in a DHCP message format.

7. A method as recited in claim 1, wherein said step of causing the verification value to be determined based on the particular password value and the challenge value further comprises one of:
    causing the verification value to be determined using MD5 algorithm;
    causing the verification value to be determined using SHA-256 algorithm; and
    causing the verification value to be determined using SHA-512 algorithm.

8. A method as recited in claim 1, said step of receiving the response message further comprising receiving a response message that includes authentication method data that indicates a method for determining the verification value based on the particular password value and the challenge value.

9. A method as recited in claim 1, said step of receiving the DHCP discover message further comprising receiving a DHCP discover message that includes authentication method data that indicates a method for determining the verification value based on the particular password value and the challenge value.

10. A method as recited in claim 1, wherein the challenging process is part of a DHCP server.

11. A method as recited in claim 1, wherein the challenging process is part of the AAA process.

12. A method as recited in claim 1, wherein the challenging process is part of a relay agent for a DHCP server.

13. A method as recited in claim 1, said step of causing the particular verification value to be determined further comprising the step of sending to the AAA server an AAA request message that includes data that indicates the particular user identifier value, wherein the AAA server determines the particular password based on the particular user identifier.

14. A method as recited in claim 13, said step of causing the verification value to be determined further comprising the step of sending to the AAA server an AAA request message that includes data that indicates the current challenge value and the response value, wherein the AAA server determines the verification value based on the challenge value and determines whether the verification value matches the response value.

15. A method as recited in claim 14, said step of determining whether the response value matches the verification value further comprising receiving an AAA response message that includes data that indicates whether the response value matches the verification value.

16. A method as recited in claim 5, said step of preventing the DHCP offer from being sent to the customer network node further comprising the step of dropping the DHCP request without forwarding the DHCP request to a DHCP server executing on a different, third network node on the service provider premises.

17. A method as recited in claim 5, said step of preventing the DHCP offer from being sent to the customer network node further comprising the step of sending a DHCP message that includes data that indicates authentication failure.

18. A method as recited in claim 1, further comprising omitting authentication based on a Point-to-Point Protocol (PPP).

19. A method as recited in claim 10, wherein:
    said step of receiving the DHCP request further comprising entering an authentication state at a DHCP server executing on a third network node on the service provider premises, wherein in an authentication state a DHCP offer is not sent by the DHCP server; and
    said step of preventing the DHCP offer from being set further comprising sending a DHCP authentication failure message from the DHCP server,
    dropping the DHCP request from the DHCP server,
    exiting the authentication state at the DHCP server, and
    entering a state at the DHCP server for receiving another DHCP request.

20. A method as recited in claim 19, the method further comprises, if it is determined that the response value matches the verification value, then performing the steps of:
    sending a DHCP authentication success message from the DHCP server;
    existing the authentication state at the DHCP server; and
    sending the DHCP offer from the DHCP server to the customer network node in response to the DHCP request.

21. An apparatus for authenticating a user for access to a service provider network, comprising:
- one or more processor;
- means for receiving at a challenging process from a customer network node on a customer premises different from a premises for the apparatus, a Dynamic Host Configuration Protocol (DHCP) request for configuration data necessary to receive a unicast on an Internet Protocol (IP) network, wherein the DHCP request includes user identifier data that indicates a particular user identifier value;
- means for determining a current challenge value that can not be predicted by knowledge of any previous challenge value;
- means for sending to the customer network node a challenge message that includes the current challenge value;
- means for receiving from the customer network node a response message that includes a response value;
- means for causing a verification value to be determined based on a particular password value, associated with the user identifier value in an Authentication, Authorization and Accounting (AAA) process, and the current challenge value using a secure process that renders impractical an attempt to derive the particular password value from the challenge value and the verification value;
- means for determining whether the response value matches the verification value;
- means for preventing a DHCP offer from being sent to the customer network node in response to the DHCP request, if it is determined that the response value does not match the verification value, whereby unicast communication over the IP network by the customer network node is prevented; and
- wherein at least one of the challenge message and the response message is formatted according to a DHCP message format using a unique value for a DHCP message type option.

22. An apparatus for authenticating a user for access to a service provider network, comprising:
- a network interface that is coupled to a network for communicating one or more packet flows therewith;
- one or more processors;
- a computer readable medium; and
- one or more sequences of instructions stored on the computer readable medium, which, when executed by the one or more processors, causes the one or more processors to carry out the steps of:
  - receiving on the network interface from a customer network node on a customer premises different from a service provider premises, a Dynamic Host Configuration Protocol (DHCP) request for configuration data necessary to receive a unicast on an Internet Protocol (IP) network, wherein the DHCP request includes user identifier data that indicates a particular user identifier value;
  - determining a current challenge value that can not be predicted by knowledge of any previous challenge value;
  - sending on the network interface to the customer network node a challenge message that includes the current challenge value;
  - causing a verification value to be determined based on a particular password value, associated with the user identifier value in an Authentication, Authorization and Accounting (AAA) process, and the current challenge value using a secure process that renders impractical an attempt to derive the particular password value from the challenge value and the verification value;
  - receiving on the network interface from the customer network node a response message that includes a response value;
  - determining whether the response value matches the verification value;
- if it is determined that the response value does not match the verification value, then preventing a DHCP offer from being sent to the customer network node in response to the DHCP request, whereby unicast communication over the IP network by the customer network node is prevented; and
  - wherein at least one of the challenge message and the response message is formatted according to a DHCP message format using a unique value for a DHCP message type option.

23. An apparatus as recited in claim 22, wherein execution of the one or more sequences of instructions by the one or more processors further causes the one or more processors to carry out the step of, if it is determined that the response value matches the verification value, then causing the DHCP offer to be sent to the customer network node in response to the DHCP request, whereby unicast communication over the IP network by the customer network node is permitted.

24. An apparatus as recited in claim 22, further comprising one or more sequences of instructions stored on the computer readable medium, which, when executed by the one or more processors, causes the one or more processors to carry out the steps of the AAA process.

25. An apparatus as recited in claim 22, further comprising one or more sequences of instructions stored on the computer readable medium, which, when executed by the one or more processors, causes the one or more processors to carry out the steps of a broadband remote access server (BRAS) for serving as a gateway between an internetwork and an access network connected to multiple customer premises.

26. An apparatus as recited in claim 25, wherein the challenging process is part of the BRAS.

27. An apparatus as recited in claim 22, wherein at least one of the challenge message and the response message is formatted according to the Extensible Authentication Protocol (EAP) for use in a DHCP message format.

28. An apparatus as recited in claim 22, wherein said step of causing the verification value to be determined based on the particular password value and the challenge value further comprises one of:
- causing the verification value to be determined using MD5 algorithm;
- causing the verification value to be determined using SHA-256 algorithm; and
- causing the verification value to be determined using SHA-512 algorithm.

29. An apparatus as recited in claim 22, said step of receiving the response message further comprising receiving a response message that includes authentication method data that indicates a method for determining the verification value based on the particular password value and the challenge value.

30. An apparatus as recited in claim 22, said step of receiving the DHCP discover message further comprising receiving a DHCP discover message that includes authentication method data that indicates a method for determining the verification value based on the particular password value and the challenge value.

31. An apparatus as recited in claim 22, further comprising one or more sequences of instructions stored on the computer readable medium, which, when executed by the one or more processors, causes the one or more processors to carry out the steps of a DHCP server.

32. An apparatus as recited in claim 22, further comprising one or more sequences of instructions stored on the computer readable medium, which, when executed by the one or more processors, causes the one or more processors to carry out the steps of the AAA process.

33. An apparatus as recited in claim 22, further comprising one or more sequences of instructions stored on the computer readable medium, which, when executed by the one or more processors, causes the one or more processors to carry out the steps of a relay agent for a DHCP server.

34. An apparatus as recited in claim 22, said step of causing the particular verification value to be determined further comprising the step of sending to the AAA server an AAA request message that includes data that indicates the particular user identifier value, wherein the AAA server determines the particular password based on the particular user identifier.

35. An apparatus as recited in claim 34, said step of causing the verification value to be determined further comprising the step of sending to the AAA server an AAA request message that includes data that indicates the current challenge value and the response value, wherein the AAA server determines the verification value based on the challenge value and determines whether the verification value matches the response value.

36. An apparatus as recited in claim 35, said step of determining whether the response value matches the verification value further comprising receiving an AAA response message that includes data that indicates whether the response value matches the verification value.

37. An apparatus as recited in claim 26, said step of preventing the DHCP offer from being sent to the customer network node further comprising the step of dropping the DHCP request without forwarding the DHCP request to a DHCP server executing on a different, network node on the service provider premises.

38. An apparatus as recited in claim 26, said step of preventing the DHCP offer from being sent to the customer network node further comprising the step of sending a DHCP message that includes data that indicates authentication failure.

39. An apparatus as recited in claim 22, wherein execution of the one or more sequences of instructions by the one or more processors further causes the one or more processors to carry out the step of omitting authentication based on a Point-to-Point Protocol (PPP).

40. An apparatus as recited in claim 31, wherein:
said step of receiving the DHCP request further comprising entering an authentication state, wherein in an authentication state a DHCP offer is not sent by the DHCP server; and
said step of preventing the DHCP offer from being set further comprising sending a DHCP authentication failure message from the DHCP server,
dropping the DHCP request from the DHCP server,
exiting the authentication state at the DHCP server, and
entering a state at the DHCP server for receiving another DHCP request.

41. An apparatus as recited in claim 40, wherein execution of the one or more sequences of instructions by the one or more processors further causes the one or more processors to carry out the step of, if it is determined that the response value matches the verification value, then:
sending a DHCP authentication success message from the DHCP server;
exiting the authentication state at the DHCP server; and
sending the DHCP offer from the DHCP server to the customer network node in response to the DHCP request.

42. A method for authenticating a user for access to a network comprising:
receiving from a user node, at a challenging process, a Dynamic Host Configuration Protocol (DHCP) request for configuration data necessary to receive a unicast on an Internet Protocol (IP) network, wherein the DHCP request includes user identifier data that indicates a particular user identifier value;
in response to receiving the DHCP request, determining a current challenge value that can not be predicted by knowledge of any previous challenge value;
sending to the user node a DHCP-formatted challenge message that includes the current challenge value;
receiving from the user node a DHCP formatted response message that includes a response value;
causing a verification value to be determined based on a particular password value, associated with the user identifier value in an Authentication, Authorization and Accounting (AAA) server and the current challenge value using a secure process that renders impractical an attempt to derive the particular password value from the challenge value and the verification value;
determining whether the response value matches the verification value;
if it is determined that the response value does not match the verification value, then preventing a DHCP offer from being sent to the customer network node in response to the DHCP request, whereby unicast communication over the IP network by the user node is prevented; and
wherein at least one of the challenge message and the response message is formatted according to a DHCP message format using a unique value for a DHCP message type option.

* * * * *

UNITED STATES PATENT AND TRADEMARK OFFICE
CERTIFICATE OF CORRECTION

PATENT NO.       : 7,624,181 B2                                    Page 1 of 1
APPLICATION NO.  : 11/362296
DATED            : November 24, 2009
INVENTOR(S)      : Townsley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Fourteenth Day of December, 2010

David J. Kappos
*Director of the United States Patent and Trademark Office*